US012743493B2

(12) United States Patent
Lucas et al.

(10) Patent No.: US 12,743,493 B2
(45) Date of Patent: Sep. 22, 2026

(54) ENHANCING SECURITY OF LARGE LANGUAGE MODELS USING CRYPTOGRAPHIC STAMP TECHNOLOGY AND PROACTIVE MODEL PROTECTION

(71) Applicant: Bank of America Corporation, Charlotte, NC (US)

(72) Inventors: Jemlin Lucas, Coppell, TX (US); Suryanarayana Adivi, Hyderabad (IN); Pushkar Taneja, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 43 days.

(21) Appl. No.: 19/008,160

(22) Filed: Jan. 2, 2025

(65) Prior Publication Data

US 2026/0187205 A1 Jul. 2, 2026

(51) Int. Cl.

| | |
|---|---|
| ***G06F 21/00*** | (2013.01) |
| ***G06F 21/16*** | (2013.01) |
| ***H04L 9/00*** | (2022.01) |
| ***H04L 9/32*** | (2006.01) |

(52) U.S. Cl.
CPC ............ *G06F 21/16* (2013.01); *H04L 9/3236* (2013.01); *H04L 9/50* (2022.05)

(58) Field of Classification Search
CPC .......... G06F 21/16; H04L 9/3236; H04L 9/50
See application file for complete search history.

(56) References Cited

U.S. PATENT DOCUMENTS

| | | | | |
|---|---|---|---|---|
| 10,956,573 | B2 | 3/2021 | Zheng et al. | |
| 11,200,318 | B2 | 12/2021 | Huang et al. | |
| 11,275,841 | B2 | 3/2022 | Poliakov | |
| 11,520,829 | B2 | 12/2022 | Rosenthal et al. | |
| 11,886,579 | B2 | 1/2024 | Stapleton et al. | |
| 11,900,068 | B1 | 2/2024 | Gray et al. | |
| 12,015,691 | B2 | 6/2024 | Habiba et al. | |
| 12,111,926 | B1 | 10/2024 | Beveridge et al. | |
| 12,130,943 | B1 | 10/2024 | Burns et al. | |
| 12,423,388 | B2 * | 9/2025 | Horton .................. | G06F 16/632 |
| 2019/0095629 | A1 | 3/2019 | Lee et al. | |
| 2020/0005133 | A1 | 1/2020 | Zhang et al. | |

(Continued)

FOREIGN PATENT DOCUMENTS

EP 1063811 B1 12/2000

*Primary Examiner* — Kendall Dolly

(57) ABSTRACT

A system receives a user request from a user from a user device, determines a task based on the user request, selects a LLM based on the task, uses the LLM to generate a digital content responsive to the user request, and generates digital watermarks for the digital content based on one or more of statistical watermarking, linguistic watermarking, or steganographic watermarking, wherein the statistical watermarking generates a hidden pattern based on portions of the digital content, the linguistic watermarking generates textual information to be inserted into the digital content, and the steganographic watermarking generates hidden information based on the digital content. The system further uses hashing algorithms to generate cryptographic stamps for the digital watermarks, generates a secured first digital content by embedding the cryptographic stamps in the digital content, and sends instructions to the user device for presenting the secured digital content.

20 Claims, 4 Drawing Sheets

(56) References Cited

U.S. PATENT DOCUMENTS

2020/0104636 A1 4/2020 Halevi et al.
2022/0019663 A1 1/2022 Stapleton et al.
2022/0215092 A1 7/2022 Parmar et al.
2023/0274003 A1 8/2023 Liu et al.
2023/0376752 A1 11/2023 Shah et al.
2024/0202323 A1 6/2024 Hoogerbrugge et al.
2024/0289436 A1 8/2024 Burns et al.
2024/0370534 A1* 11/2024 Niemi .................... G06F 21/16
2024/0370535 A1* 11/2024 Sheybani ................ G06F 21/16
2024/0371510 A1* 11/2024 Aman .................... G16H 40/63
2025/0103743 A1* 3/2025 Passoja ................... G06F 21/64
2025/0117261 A1* 4/2025 Talavera ................. G06F 9/505
2025/0131928 A1* 4/2025 Drolet ................... G10L 19/018
2025/0173727 A1* 5/2025 Kolchin ............... G06Q 20/407
2025/0209194 A1* 6/2025 Crabtree ............. G06F 21/6218
2025/0258892 A1* 8/2025 Baily .................... G06F 21/107
2025/0272361 A1* 8/2025 Horton .................. G06F 21/106
2025/0307877 A1* 10/2025 Craft ...................... G06Q 10/02
2026/0003939 A1* 1/2026 Kocibelli .............. G06F 21/105
2026/0030325 A1* 1/2026 Horton .................. G06F 21/106

* cited by examiner

ENHANCING SECURITY OF LARGE LANGUAGE MODELS USING CRYPTOGRAPHIC STAMP TECHNOLOGY AND PROACTIVE MODEL PROTECTION

TECHNICAL FIELD

The present disclosure relates generally to large language models, and more specifically, to a system and method for enhancing security of large language models using cryptographic stamp technology and proactive model protection.

BACKGROUND

Generative artificial intelligence (AI) is a type of machine learning that uses AI models to create new content, such as text, images, videos, and music. A large language model (LLM) is a type of generative AI model designed for natural language processing tasks such as language generation. As language models, LLMs acquire these abilities by learning statistical relationships from vast amounts of text during a self-supervised and semi-supervised training process. The largest and most capable LLMs are artificial neural networks built with a decoder-only transformer-based architecture, enabling efficient processing and generation of large-scale text data.

SUMMARY

There is a growing concern about the security and integrity of large language models (LLMs) created using user data. The problem arises when these LLMs are compromised by threat actors, either by gaining direct access to the models or by replicating their capabilities. This has significant implications as compromised LLMs can be manipulated to provide misleading or biased outputs and potentially violate specific standards. For instance, a malicious actor could gain access to an LLM to analyze user interactions and use it to create prohibited user interactions or manipulate the model to provide biased decisions that may not meet specific requirements.

The system disclosed in the present application provides a technical solution to the above-mentioned problems. The disclosed system can enhance the security of large language models (LLMs) by integrating cryptographic stamp technology with generative artificial intelligence (GEN-AI). The system uses cryptographic stamp technology to embed hidden information (e.g., digital watermarks) within text generated by LLMs. These watermarks can be used to trace the origin of the generated text back to the specific LLM that generated such text. The GEN-AI integration uses non-fungible tokens (NFTs) to store watermarks in a blockchain, ensuring secure ownership and making it difficult for malicious actors to claim ownership or manipulate the LLMs. Digital watermarks can help identify the source of generated text, making it easier to trace malicious activity back to the LLM it originated from. Knowing that their outputs can be traced may deter malicious actors from using stolen or compromised LLMs. Digital watermarks can also improve the overall security posture of LLMs by making them more tamper-proof. By integrating cryptographic stamp technology with GEN-AI, the disclosed system and methods create a more secure and transparent LLM framework, reducing the risk of malicious activity and maintaining the integrity of user data.

In one embodiment, the disclosed system includes a memory operable to store a plurality of large language models (LLMs), one or more hashing algorithms, and a generative artificial-intelligence (AI) model. The disclosed system also includes a processor operably coupled to the memory. The processor is configured to determine a task based on the first user request. The processor is then configured to select, based on the task, a first LLM among the plurality of LLMs. The processor is then configured to use the first LLM to generate a first digital content responsive to the user request. The processor is then configured to generate one or more first digital watermarks for the first digital content based on one or more of statistical watermarking, linguistic watermarking, or steganographic watermarking. The statistical watermarking generates a hidden pattern based on one or more portions of the first digital content. The linguistic watermarking generates textual information to be inserted into the first digital content. The steganographic watermarking generates hidden information based on the first digital content. The processor is then configured to use the one or more hashing algorithms to generate one or more first cryptographic stamps for the one or more first digital watermarks. The processor is then configured to generate a secured first digital content by embedding the one or more first cryptographic stamps in the first digital content. The processor is further configured to send instructions to the user device for presenting the secured first digital content.

In one embodiment, the processor of the disclosed system is further configured to access a second digital content generated by a second LLM among the plurality of LLMs. The processor is then configured to use the generative artificial-intelligence (AI) model to determine whether the second digital content comprises embedded cryptographic stamps. The processor is then configured to generate an alert indicating a security threat associated with the second LLM if the second digital content does not comprise embedded cryptographic stamps.

In one embodiment, the processor of the disclosed system is further configured to generate one or more first non-fungible tokens (NFTs) for the one or more first cryptographic stamps, respectively. The processor is then configured to store the one or more first NFTs in a blockchain network. The blockchain network stores a plurality of NFTs corresponding to a plurality of respective cryptographic stamps associated with the plurality of LLMs.

In one embodiment, the first NFTs comprise identity information associated with the first user, wherein the identity information within the first NFTs is configured for tracking the first user's ownership of digital content.

In one embodiment, the processor of the disclosed system is further configured to access a second digital content comprising one or more second embedded cryptographic stamps. The processor is then configured to generate one or more second NFTs for the respective second embedded cryptographic stamps. The processor is then configured to determine whether the second digital content was generated by one of the plurality of LLMs, which includes comparing the one or more second NFTs with the plurality of NFTs stored in the blockchain network and determining whether the one or more second NFTs match one or more of the plurality of NFTs based on the comparison.

In one embodiment, the processor of the disclosed system is further configured to generate an alert indicating a security threat upon determining the second digital content was not generated by any one of the plurality of LLMs.

In one embodiment, the processor of the disclosed system is further configured to identify one or more stored NFTs that match the one or more second NFTs. The processor is then configured to determine one or more embedded cryptographic stamps corresponding to the identified NFTs. The processor is then configured to identify a second LLM among the plurality of LLMs based on the determined embedded cryptographic stamps.

In one embodiment, the second digital content is associated with a second user request. Accordingly, the processor is further configured to generate an original digital content for the second digital content by removing the second embedded cryptographic stamps. The processor is then configured to use the second LLM to generate a third digital content based on to the second user request. The processor is further configured to determine whether the original digital content matches the third digital content.

In one embodiment, the processor of the disclosed system is further configured to generate an alert indicating a security threat associated with the second LLM upon determining the original digital content does not match the third digital content.

In one embodiment, the processor of the disclosed system is further configured to select, based on the digital content, one or more of the statistical watermarking, the linguistic watermarking, or the steganographic watermarking to generate the one or more first digital watermarks for the first digital content.

The disclosed system and methods provide the practical application of generating secured digital content by LLMs and identifying LLMs that have security risks. There is a growing concern about the security and integrity of LLMs created using user data when they are compromised by threat actors, either by gaining direct access to the models or by replicating their capabilities. The disclosed system and methods can address such problems by integrating cryptographic stamp technology with generative artificial intelligence (GEN-AI) to create a robust and secure LLM framework. As described in example embodiments of the present disclosure, the disclosed system and methods use advanced hash-key cryptographic stamp techniques to embed digital watermarks within digital content generated by LLMs. Digital watermarks make it difficult for malicious actors to detect an LLM that generated a particular digital content and manipulate the LLM, thereby improving the overall security posture of LLMs. The disclosed system and methods then use non-fungible tokens (NFTs) to store the hash-key cryptographic stamps in the blockchain, ensuring that the ownership of the LLM is secured, making it difficult for malicious actors to claim ownership or manipulate it. The disclosed system and methods further trace malicious activities associated with digital content back to the LLM it originated from using the hash-key cryptographic stamps stored by NFTs. With accurate identification of the LLM, GEN-AI can analyze the behavior and output of the LLM and identify potential security threats and vulnerabilities in the LLM.

Technical advantages of certain embodiments of this disclosure may include one or more of the following. By integrating cryptographic stamp technology with GEN-AI, the disclosed system and methods can achieve improved security posture of LLMs, reducing the risk of malicious activity and maintaining the integrity of user data. For example, digital watermarks in the cryptographic stamps are tamper-proof, making it difficult for malicious actors to manipulate or alter the LLM-generated digital content. As another example, the disclosed system and methods use multi-factor watermarking by integrating multiple watermarking techniques, including statistical watermarking, linguistic watermarking, and steganographic watermarking, to create a robust and tamper-proof LLM framework. The disclosed system and methods can provide a secure and transparent way to track ownership by storing and verifying digital watermarks embedded in LLM-generated digital content using NFTs. For example, the disclosed system can generate an alert in case of an unmatched NFT. Instead of simply reacting to threats after they occur, the disclosed system and methods proactively use digital watermarks to protect LLMs from malicious activities. For example, digital watermarks can help identify the source of a generated text, making it easier to trace malicious activities on the text back to the LLM from which it originated. Once the LLM is identified, the disclosed system and methods can use GEN-AI to identify potential security threats and vulnerabilities. Knowing that their outputs can be traced can deter malicious actors from compromising LLMs.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
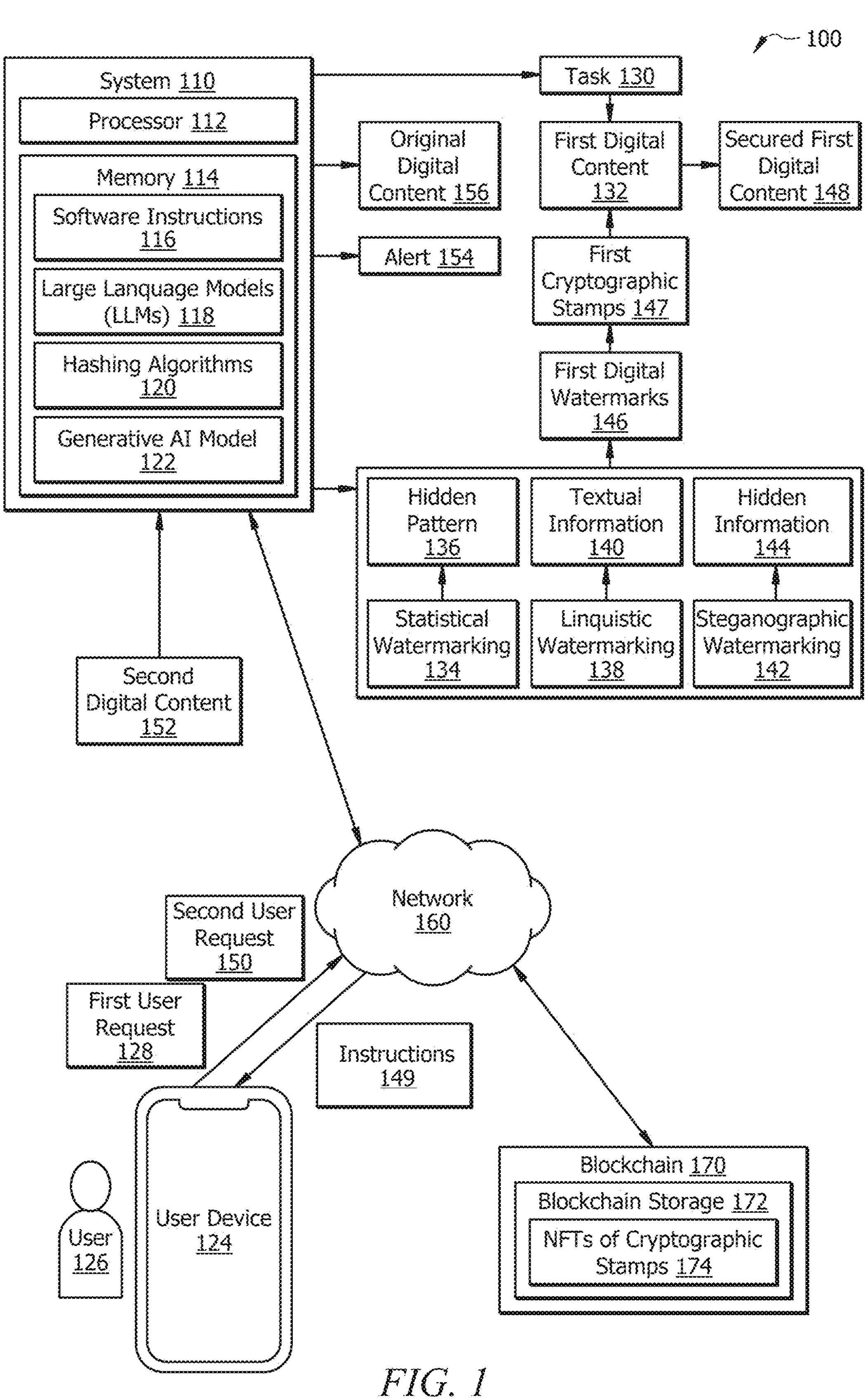
FIG. 1 illustrates one embodiment of an architecture that is configured for enhancing LLM security.
Figure 2:
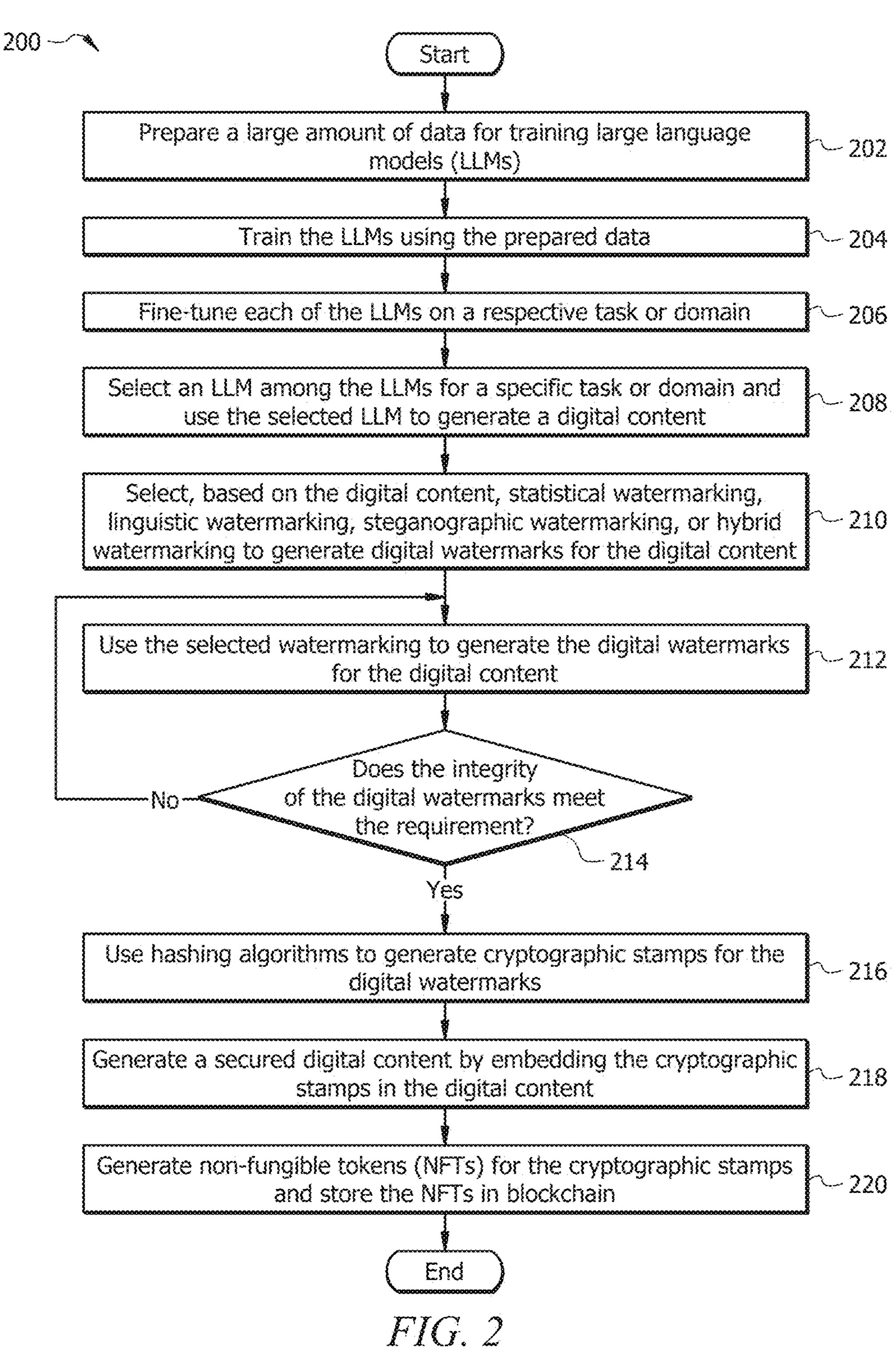
FIG. 2 illustrates an example flowchart of a method for generating secured digital content using LLM.
Figure 3A:
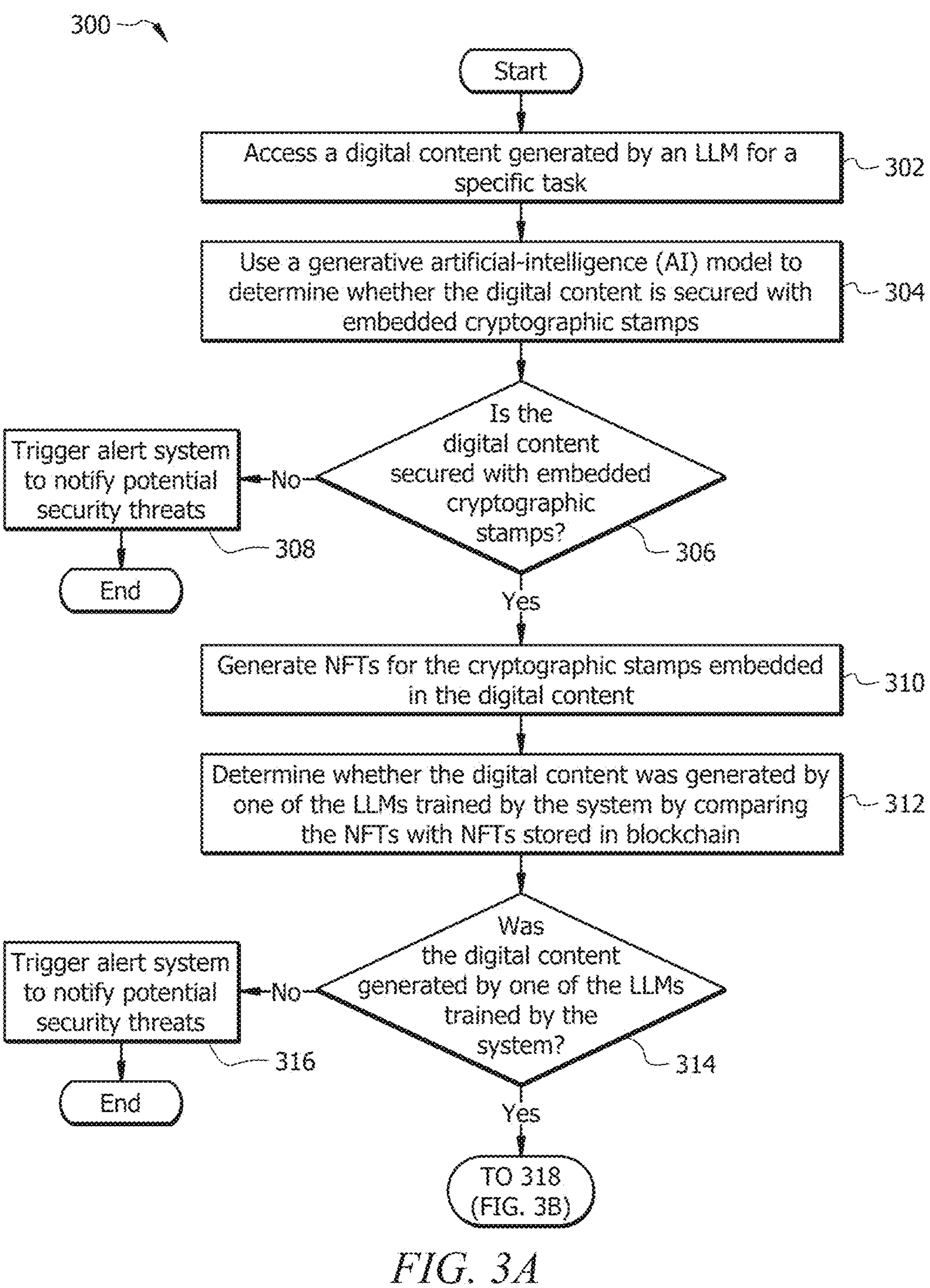
FIGS. 3A-3B illustrates an example flowchart of a method for tracing origin of digital content to specific LLM.
Figure 3B:
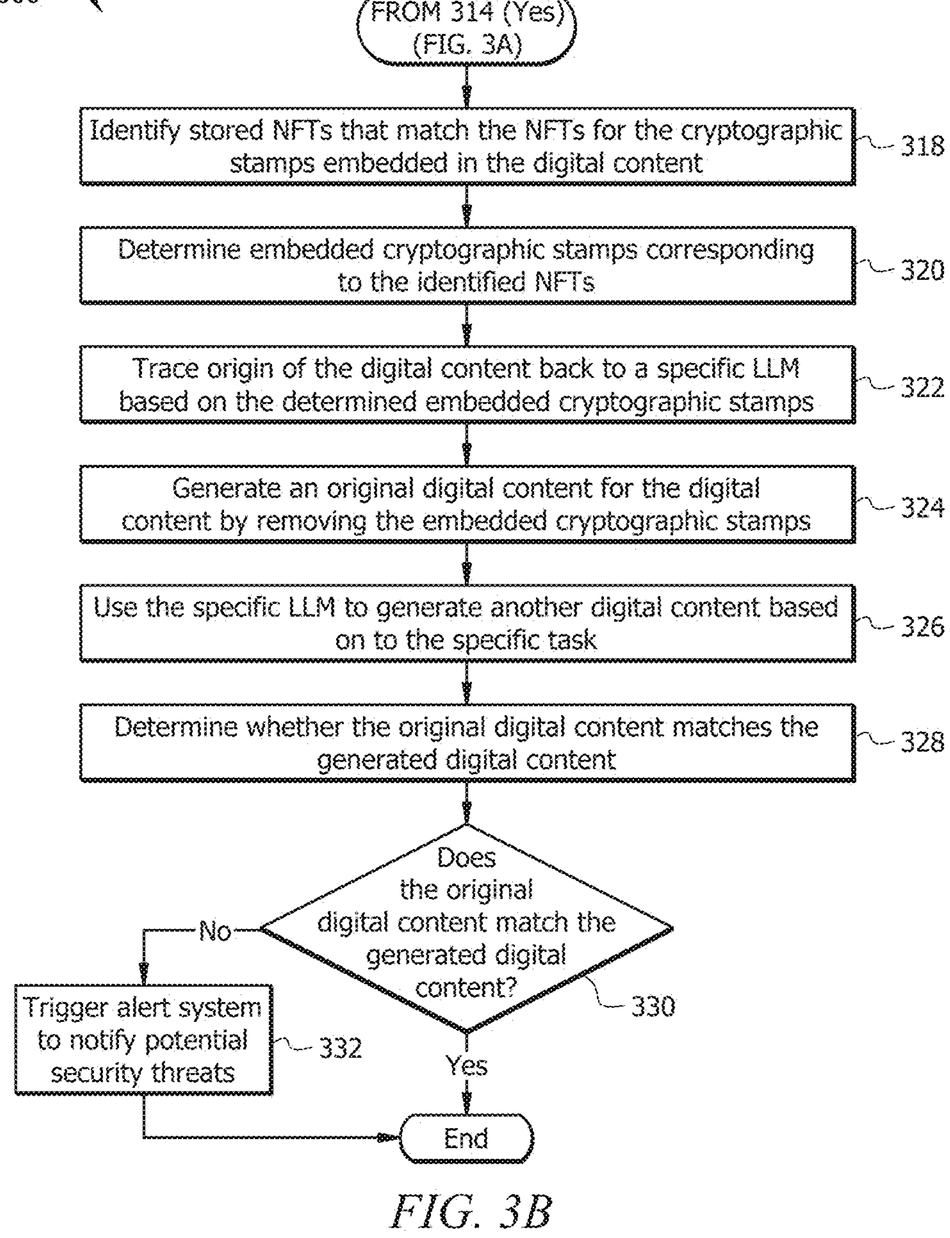

As described above, there is a growing concern about the security and integrity of large language models (LLMs) created using user data. This disclosure provides various systems and methods to enhance security of LLMs using cryptographic stamp technology and proactive model protection. FIG. 1 illustrates one embodiment of an architecture that is configured for enhancing LLM security. FIG. 2 illustrates an example flowchart of a method for generating secured digital content using LLM. FIGS. 3A-3B illustrates an example flowchart of a method for tracing origin of digital content to specific LLM.

Example System for Enhancing LLM Security

FIG. 1 illustrates one embodiment of an architecture 100 that is configured for enhancing LLM security. Architecture 100 comprises a system 110, a user device 124, a network 160, and a blockchain 170. In some embodiments, architecture 100 may not have all of the components listed and/or may have other elements instead of, or in addition to, those listed above.

Architecture Components

System

System 110 is generally any device configured to process data and communicate with devices (e.g., user device 124), systems (e.g., blockchain 170), etc. System 110 is generally configured to perform operations described below in conjunction with method 200 described in FIG. 2, method 300 described in FIGS. 3A-3B. In one embodiment, system 110 comprises processors 112 in signal communication with a memory 114.

Processors 112 comprise one or more processors operably coupled to the memory 114. Processors 112 are any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). Processors 112 may be a programmable logic device, a microcontroller, a microprocessor, or any suitable combination of the preceding. Processors 112 are communicatively coupled to and in signal communication with memory 114. Processors 112 are configured to process data. For example, processors 112 may be 8-bit, 16-bit, 32-bit, 64-bit or of any other suitable architecture. Processors 112 may include an arithmetic logic unit (ALU) for performing arithmetic and logic operations, processors register that supply operands to the ALU and store the results of ALU operations, and a control unit that fetches software instructions 116 from memory 114 and executes them by directing the coordinated operations of the ALU, registers and other components. Processors 112 are configured to implement various software instructions 116. For example, processors 112 are configured to execute software instructions 116 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

Memory 114 may be volatile or non-volatile and may comprise a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. Memory 114 is operable to store the software, e.g., large language models (LLMs) 118, hashing algorithms 120, a generative AI model 122, and/or any other data or software instructions 116. The software instructions 116 may comprise any suitable set of instructions, logic, rules, or code operable to execute the processors 112. The software instructions 116, when executed by the processors 112, cause the processors 112 to perform one or more functions described herein. For example, when the software instructions 116 are executed, the processors 112 execute the software instructions 116 to use advanced hash-key cryptographic stamp techniques to embed digital watermarks 146 within digital content 132 generated by LLMs 118. As another example, when the software instructions 116 are executed, the processors 112 execute the software instructions 116 to use digital watermarks 146 to trace the origin of generated text back to specific LLM 118.

User Device

Examples of user device 124 operated by user 126 include, but are not limited to, computers, laptops, mobile devices (e.g., smartphones or tablets), servers, clients, or any other suitable type of device. User device 124 is generally configured to capture data and send instructions for processing the data to system 110. For example, the data may comprise secured digital content 148 generated by LLMs 118, and the instructions may comprise a request (e.g., first user request 128 or second user request 150) for the secured digital content 148. In other examples, the data may comprise any suitable type of data. The instructions may comprise any suitable type or number of commands for processing the data.

Network

Network 160 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 160 may be configured to support any suitable type of communication protocol as would be appreciated by one of ordinary skill in the art.

Blockchain

Blockchain 170 generally is an open, decentralized and distributed digital ledger consisting of records called blocks that are used to record data interactions across many computing nodes. Each computing node of blockchain 170 may maintain a copy of the blockchain ledger. Logically, blockchain 170 is a chain of blocks which contains specific information.

Blockchain 170 may comprise blockchain storage 172. Blockchain storage 172 is generally any device that is configured to store and process data and communicate with other components of blockchain 170. Blockchain storage 172 is maintained by the chain of blocks. As shown in FIG. 1, blockchain storage 172 includes NFTs of cryptographic stamps 174. In operation, system 110 generates NFTs of cryptographic stamps 174 for LLMs 118 and transmits NFTs of cryptographic stamps 174 to blockchain 170. Blockchain 170 then records NFTs of cryptographic stamps 174 in blockchain storage 172.

Once recorded, the data in blockchain storage 172 maintained by one block cannot be altered retroactively without the alteration of all subsequent blocks, which requires the consensus of the network majority. Each computing node within blockchain 170 maintains, approves, and updates new entries. Blockchain 170 is controlled not only by separate individuals but by everyone within the blockchain network. Each member ensures that all records and procedures are in order, which results in data validity and security. By design, blockchain 170 is resistant to modification of the data. For use as a distributed ledger, blockchain 170 is typically managed by a peer-to-peer network collectively adhering to a protocol for inter-node communication and validating new blocks.

Operational Flow for Generating Secured Digital Content Using LLMs

In one embodiment, user 126 may use user device 124 to transmit a first user request 128 to system 110 via network 160. System 110 may determine a task 130 based on the first user request 128. For example, the first user request 128 may be a request for a summary of user profiles written in natural language. Accordingly, the task 130 may be generating a summary of user profiles using natural language. Based on the task 130, system 110 may select a first LLM 118 among the LLMs 118 stored in memory 114. Continuing with the previous example, the first LLM 118 may be particularly trained for generating summaries of user profiles. System 110 may further use the first LLM 118 to generate a first digital content 132.

System 110 may generate first digital watermarks 146 for the first digital content 132 based on statistical watermarking 134, linguistic watermarking 138, and steganographic watermarking 142. In one embodiment, statistical watermarking 134 generates a hidden pattern 136 based on one or more portions of the first digital content 132. For example, the hidden pattern 136 may be repeating a number in a certain frequency. Linguistic watermarking 138 generates textual information 140 to be inserted into the first digital content 132. For example, the textual information 140 may be certain keywords. Steganographic watermarking 142 generates hidden information 144 based on the first digital content 132. For example, the hidden information 144 may be blurred identifiers of user profiles.

System 110 may select one or more of statistical watermarking 134, linguistic watermarking 138, and steganographic watermarking 142 based on the first digital content 132. For example, if the first digital content 132 is an instruction of how to access a user profile, system 110 may select steganographic watermarking 138. As another example, if the first digital content 132 is a summary of user profiles, system 110 may select a combination of statistical watermarking 134, linguistic watermarking 138, and steganographic watermarking 142.

First digital watermarks 146 can make it difficult for malicious actors to detect that the first LLM 118 generated the secured first digital content 148 and manipulate the first LLM 118, thereby improving the overall security posture of LLMs 118. Using multi-factor watermarking by integrating multiple watermarking techniques, including statistical watermarking 134, linguistic watermarking 138, and steganographic watermarking 142 can further make the first LLM 118 robust and tamper-proof.

System 110 may further use the hashing algorithms 120 stored in memory 114 to generate first cryptographic stamps 147 for the first digital watermarks 146. System 110 may then generate a secured first digital content 148 by embedding the first cryptographic stamps 147 in the first digital content 132. System 110 may further send instructions 149 for presenting the secured first digital content 148 to user device 124 via network 160.

In one embodiment, system 110 may further generate NFTs 174 for the first cryptographic stamps 147. System 110 may store the NFTs 174 in blockchain storage 172 of blockchain 170. Each NFT 174 may include identity information associated with user 126 and the identity information can be used to track user's 126 ownership of secured digital contents 148.

Operational Flow for Tracing Origin of Digital Content to Specific LLM

System 110 may access a second digital content 152. In one embodiment, the second digital content 152 may be generated by a second LLM 118 among the LLMs 118 stored in memory 114. To determine whether the second LLM 118 has any potential security threat, system 110 may use the generative AI model 122 to analyze the second digital content 152 and determine whether the second digital content 152 is embedded with cryptographic stamps. System 110 may generate an alert 154 if the second digital content 152 is not embedded with cryptographic stamps. The alert 154 may indicate that the second LLM 118 has a security threat because it did not embed cryptographic stamps in the second digital content 152, which makes the second digital content 152 not secured.

In another embodiment, the second digital content 152 may be generated by an LLM but the LLM may or may not be among the LLMs 118 stored in memory 114. In this case, system 110 may use the generative AI model 122 to analyze the second digital content 152 and identity second cryptographic stamps embedded in the second digital content 152. System 110 may then generate NFTs for the second embedded cryptographic stamps. System 110 may compare the NFTs for the second embedded cryptographic stamps with the NFTs 174 stored in blockchain storage 172. The NFTs 174 stored in blockchain storage 172 may be associated with LLMs 118 stored in memory 114. System 110 may determine whether the NFTs for the second embedded cryptographic stamps match any of the NFTs 174 stored in blockchain storage 172. If there is a match, system 110 may determine the second digital content 152 was generated by one of the LLMs 118 stored in memory 114. If there is no match, system 110 may determine the second digital content 152 was not generated by any of the LLMs 118 stored in memory 114 and generate an alert 154. The alert 154 may indicate that there is a security threat.

If there is a match, which indicates the second digital content 152 was generated by one of the LLMs 118 stored in memory 114, system 110 may further trace the origin of the second digital content 152 to a specific LLM 118 among the LLMs 118 stored in memory 114. In one embodiment, system 110 may identify the NFTs 174 stored in blockchain storage 172 that match the NFTs for the second embedded cryptographic stamps. System 110 may further determine the embedded cryptographic stamps corresponding to the identified NFTs 174. Based on the embedded cryptographic stamps, system 110 can identify the specific LLM 118 that generated the second digital content 152.

System 110 may further determine whether the traced LLM 118 has any security threat. In one embodiment, system 110 may identity a second user request 150 associated with the second digital content 152. System 110 may generate an original digital content 156 for the second digital content 152 by removing the second embedded cryptographic stamps. System 110 may then use the traced LLM 118 to regenerate a digital content based on the second user request 150. System 110 may compare the original digital content 156 with the regenerated digital content by the traced LLM 118 to determine whether they match. If the original digital content 156 does not match the regenerated digital content by the traced LLM 118, system 110 may generate an alert 154. The alert 154 may indicate that the traced LLM 118 has a security threat.

Example Methods for Enhancing LLM Security

FIG. 2 illustrates an example flowchart of a method 200 for generating secured digital content using LLM. Modifications, additions, or omissions may be made to method 200. Method 200 may include more, fewer, or other operations. For example, operations may be performed in parallel or in any suitable order. While at times discussed system 110, or components of any of thereof performing operations, any suitable system or components of the system may perform one or more operations of method 200. For example, one or more operations of method 200 may be implemented, at least in part, in the form of software instructions (e.g., software instructions 116 of FIG. 1), stored on non-transitory, tangible, machine-readable media (e.g., memory 114 of FIG. 1) that when run by one or more processors (e.g., processors 112 of FIG. 1) may cause the one or more processors to perform operations 202-220.

After start, system 110 prepares a large amount of data for training large language models (LLMs) 118 at operation 202. For example, the data can be text data.

At operation 204, system 110 trains the LLMs 118 using the prepared data.

At operation 206, system 110 fine-tunes each of the LLMs 118 on a respective task 130 or domain.

At operation 208, system 110 selects an LLM 118 among the LLMs 118 for a specific task 130 or domain and uses the selected LLM 118 to generate a digital content 132.

At operation 210, system 110 selects, based on the digital content 132, statistical watermarking 134, linguistic watermarking 138, steganographic watermarking 142, or hybrid watermarking to generate digital watermarks 146 for the digital content 132.

At operation 212, system 110 uses the selected watermarking to generate the digital watermarks 146 for the digital content 132. In an embodiment, the statistical watermarking 134 may generate a hidden pattern 136 based on portions of the digital content 132 and embed the hidden pattern 136 as statistical watermarks into the digital content 132. The linguistic watermarking 138 may generate textual information 140 to be embedded into the digital content 132. The steganographic watermarking 142 may generate hidden information 144 based on the digital content 132 and embed the hidden information 144 as steganographic watermarks into the digital content 132. Hybrid watermarking may embed hybrid watermarks of statistical watermarks, linguistic watermarks, and steganographic watermarks into the digital content 132. For example, the digital content 132 may be an email and the digital watermarks 146 may include repeated keywords at a certain frequency that are embedded in the email.

At operation 214, system 110 determines whether the integrity of the digital watermarks 146 meets the requirement. Integrity refers to the ability of a digital watermark 146 to reliably detect if digital content 132 has been altered or tampered with. If the integrity does not meet the requirement, method 200 may return to operation 212, where system 110 may re-generate the digital watermarks 146.

If the integrity meets the requirement, method 200 may proceed to operation 216, where system 110 uses hashing algorithms 120 to generate cryptographic stamps 147 for the digital watermarks 146.

At operation 218, system 110 generates a secured digital content 148 by embedding the cryptographic stamps 147 in the digital content 132.

At operation 220, system 110 generates non-fungible tokens (NFTs) 174 for the cryptographic stamps 147 and stores them in the blockchain 170. Storing NFTs 174 for the cryptographic stamps 147 in the blockchain 170 may ensure that the ownership of the LLM 118 is secured, preventing unauthorized access to the LLM 118.

Method 200 then ends.

FIGS. 3A-3B illustrates an example flowchart of a method 300 for tracing origin of digital content to specific LLM. Modifications, additions, or omissions may be made to method 200. Method 200 may include more, fewer, or other operations. For example, operations may be performed in parallel or any suitable order. While at times discussed as system 110, or components of any performing operations, any suitable system or components of the system may perform one or more operations of the method 300. For example, one or more operations of method 300 may be implemented, at least in part, in the form of software instructions (e.g., software instructions 116 of FIG. 1), stored on non-transitory, tangible, machine-readable media (e.g., memory 114 of FIG. 1) that when run by one or more processors (e.g., processors 112 of FIG. 1) may cause the one or more processors to perform operations 302-332.

After starting, system 110 accesses digital content 152 generated by an LLM for a specific task 130 at operation 302.

At operation 304, system 110 uses a generative artificial-intelligence (AI) model 122 to determine whether the digital content 152 is secured with embedded cryptographic stamps.

After decision point 306 of whether the digital content 152 is secured with embedded cryptographic stamps, method 300 proceeds to operation 308 if the digital content 152 is not secured with embedded cryptographic stamps or to operation 310 if the digital content 152 is secured with embedded cryptographic stamps.

At operation 308, system 110 triggers an alert system to notify potential security threats. Method 300 then ends.

At operation 310, system 110 generates NFTs for the cryptographic stamps embedded in the digital content 152. In an embodiment, system 110 may further identify digital watermarks encrypted by cryptographic stamps.

At operation 312, system 110 determines whether the digital content 152 was generated by one of the LLMs 118 trained by the system by comparing the NFTs with NFTs 174 stored in the blockchain 170.

After decision point 314 of whether the digital content 152 was generated by one of the LLMs 118 trained by system 110, method 300 proceeds to operation 316 if the digital content 152 was not generated by one of the LLMs 118 trained by system 110 or to operation 318 if the digital content 152 was generated by one of the LLMs 118 trained by system 110.

At operation 316, system 110 triggers an alert system to notify potential security threats. Method 300 then ends.

At operation 318, system 110 identifies stored NFTs 174 that match the NFTs for the cryptographic stamps embedded in the digital content 152.

At operation 320, system 110 determines embedded cryptographic stamps corresponding to the identified NFTs 174.

At operation 322, system 110 traces the origin of the digital content 152 back to a specific LLM 118 based on the determined embedded cryptographic stamps.

At operation 324, system 110 generates an original digital content 156 for the digital content 152 by removing the embedded cryptographic stamps.

At operation 326, system 110 uses the specific LLM 118 to generate another digital content based on the specific task 130.

At operation 328, system 110 determines whether the original digital content 156 matches the generated digital content.

After decision point 330 of whether the original digital content 156 matches the generated digital content, method 300 proceeds to operation 332 if the original digital content 156 does not match the generated digital content or ends if the original digital content 156 matches the generated digital content.

At operation 332, system 110 triggers an alert system to notify potential security threats. Method 300 then ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "operation for" are explicitly used in the particular claim.

The invention claimed is:

1. A system, comprising:
- a memory operable to store a plurality of large language models (LLMs), one or more hashing algorithms, and a generative artificial-intelligence (AI) model; and
- a processor, operably coupled to the memory, and configured to:
  - receive, from a user device, a first user request from a first user;
  - determine a task based on the first user request;
  - select, based on the task, a first LLM among the plurality of LLMs;
  - use the first LLM to generate a first digital content responsive to the user request;
  - generate one or more first digital watermarks for the first digital content based on one or more of statistical watermarking, linguistic watermarking, or steganographic watermarking, wherein the statistical watermarking generates a hidden pattern based on one or more portions of the first digital content, wherein the linguistic watermarking generates textual information inserted into the first digital content, and wherein the steganographic watermarking generates hidden information based on the first digital content;
  - use the one or more hashing algorithms to generate one or more first cryptographic stamps for the one or more first digital watermarks;
  - generate a secured first digital content by embedding the one or more first cryptographic stamps in the first digital content; and
  - send instructions to the user device for presenting the secured first digital content.

2. The system of claim 1, wherein the processor is further configured to:
- access a second digital content generated by a second LLM among the plurality of LLMs;
- use the generative artificial-intelligence (AI) model to determine whether the second digital content comprises embedded cryptographic stamps; and
- generate an alert indicating a security threat associated with the second LLM if the second digital content does not comprise embedded cryptographic stamps.

3. The system of claim 1, wherein the processor is further configured to:
- generate one or more first non-fungible tokens (NFTs) for the one or more first cryptographic stamps, respectively; and
- store the one or more first NFTs in a blockchain network, wherein the blockchain network stores a plurality of NFTs corresponding to a plurality of respective cryptographic stamps associated with the plurality of LLMs.

4. The system of claim 3, wherein the first NFTs comprise identity information associated with the first user, wherein the identity information within the first NFTs is configured for tracking the first user's ownership of digital contents.

5. The system of claim 3, wherein the processor is further configured to:
- access a second digital content comprising one or more second embedded cryptographic stamps;
- generate one or more second NFTs for the respective second embedded cryptographic stamps; and
- determine whether the second digital content was generated by one of the plurality of LLMs, comprising:
  - comparing the one or more second NFTs with the plurality of NFTs stored in the blockchain network; and
  - determining whether the one or more second NFTs match one or more of the plurality of NFTs based on the comparison.

6. The system of claim 5, wherein the processor is further configured to:
- generate an alert indicating a security threat upon determining the second digital content was not generated by any one of the plurality of LLMs.

7. The system of claim 5, wherein the processor is further configured to:
- identify one or more stored NFTs that match the one or more second NFTs;
- determine one or more embedded cryptographic stamps corresponding to the identified NFTs; and
- identify a second LLM among the plurality of LLMs based on the determined embedded cryptographic stamps.

8. The system of claim 7, wherein the second digital content is associated with a second user request, wherein the processor is further configured to:
- generate an original digital content for the second digital content by removing the second embedded cryptographic stamps;
- use the second LLM to generate a third digital content based on to the second user request; and
- determine whether the original digital content matches the third digital content.

9. The system of claim 8, wherein the processor is further configured to:
- generate an alert indicating a security threat associated with the second LLM upon determining the original digital content does not match the third digital content.

10. The system of claim 1, wherein the processor is further configured to:
- select, based on the digital content, one or more of the statistical watermarking, the linguistic watermarking, or the steganographic watermarking to generate the one or more first digital watermarks for the first digital content.

11. A method comprising, by one or more computing systems:
- receiving, from a user device, a first user request from a first user;
- determining a task based on the first user request;
- selecting, based on the task, a first large language model (LLM) among a plurality of LLMs;
- using the first LLM to generate a first digital content responsive to the user request;
- generating one or more first digital watermarks for the first digital content based on one or more of statistical watermarking, linguistic watermarking, or steganographic watermarking, wherein the statistical watermarking generates a hidden pattern based on one or more portions of the first digital content, wherein the linguistic watermarking generates textual information inserted into the first digital content, and wherein the steganographic watermarking generates hidden information based on the first digital content;

using one or more hashing algorithms to generate one or more first cryptographic stamps for the one or more first digital watermarks;

generating a secured first digital content by embedding the one or more first cryptographic stamps in the first digital content; and sending instructions to the user device for presenting the secured first digital content.

12. The method of claim 11, further comprising:

accessing a second digital content generated by a second LLM among the plurality of LLMs;

using a generative artificial-intelligence (AI) model to determine whether the second digital content comprises embedded cryptographic stamps; and generating an alert indicating a security threat associated with the second LLM if the second digital content does not comprise embedded cryptographic stamps.

13. The method of claim 11, further comprising:

generating one or more first non-fungible tokens (NFTs) for the one or more first cryptographic stamps, respectively; and storing the one or more first NFTs in a blockchain network, wherein the blockchain network stores a plurality of NFTs corresponding to a plurality of respective cryptographic stamps associated with the plurality of LLMs.

14. The method of claim 13, wherein the first NFTs comprise identity information associated with the first user, wherein the identity information within the first NFTs is configured for tracking the first user's ownership of digital contents.

15. The method of claim 13, further comprising:

accessing a second digital content comprising one or more second embedded cryptographic stamps;

generating one or more second NFTs for the respective second embedded cryptographic stamps; and determining whether the second digital content was generated by one of the plurality of LLMs, comprising:

comparing the one or more second NFTs with the plurality of NFTs stored in the blockchain network; and determining whether the one or more second NFTs match one or more of the plurality of NFTs based on the comparison.

16. A non-transitory computer-readable medium storing instructions that when executed by a processor cause the processor to:

receive, from a user device, a first user request from a first user;

determine a task based on the first user request;

select, based on the task, a first large language model (LLM) among a plurality of LLMs;

use the first LLM to generate a first digital content responsive to the user request;

generate one or more first digital watermarks for the first digital content based on one or more of statistical watermarking, linguistic watermarking, or steganographic watermarking, wherein the statistical watermarking generates a hidden pattern based on one or more portions of the first digital content, wherein the linguistic watermarking generates textual information inserted into the first digital content, and wherein the steganographic watermarking generates hidden information based on the first digital content;

use one or more hashing algorithms to generate one or more first cryptographic stamps for the one or more first digital watermarks;

generate a secured first digital content by embedding the one or more first cryptographic stamps in the first digital content; and send instructions to the user device for presenting the secured first digital content.

17. The non-transitory computer-readable medium of claim 16, wherein the instructions further cause the processor to:

access a second digital content generated by a second LLM among the plurality of LLMs;

use a generative artificial-intelligence (AI) model to determine whether the second digital content comprises embedded cryptographic stamps; and generate an alert indicating a security threat associated with the second LLM if the second digital content does not comprise embedded cryptographic stamps.

18. The non-transitory computer-readable medium of claim 16, wherein the instructions further cause the processor to:

generate one or more first non-fungible tokens (NFTs) for the one or more first cryptographic stamps, respectively; and store the one or more first NFTs in a blockchain network, wherein the blockchain network stores a plurality of NFTs corresponding to a plurality of respective cryptographic stamps associated with the plurality of LLMs.

19. The non-transitory computer-readable medium of claim 18, wherein the first NFTs comprise identity information associated with the first user, wherein the identity information within the first NFTs is configured for tracking the first user's ownership of digital contents.

20. The non-transitory computer-readable medium of claim 19, wherein the instructions further cause the processor to:

access a second digital content comprising one or more second embedded cryptographic stamps;

generate one or more second NFTs for the respective second embedded cryptographic stamps; and determine whether the second digital content was generated by one of the plurality of LLMs, comprising:

comparing the one or more second NFTs with the plurality of NFTs stored in the blockchain network; and determining whether the one or more second NFTs match one or more of the plurality of NFTs based on the comparison.

* * * * *